United States Patent [19]

Stratta et al.

[11] 4,394,469

[45] Jul. 19, 1983

[54] POLYSILOXANE TREATED ANTIMONY COMPOUNDS

[75] Inventors: Julius J. Stratta, Yorktown Heights, N.Y.; Lloyd M. Robeson, White House Station, N.J.; Richard V. Girardi, Mahopac, N.Y.

[73] Assignee: Union Carbide Corporation, Danbury, Conn.

[21] Appl. No.: 363,103

[22] Filed: Mar. 29, 1982

[51] Int. Cl.$^3$ .............................................. C08K 9/06
[52] U.S. Cl. ................... 523/212; 523/213; 252/609; 524/409; 524/410
[58] Field of Search ............... 523/212, 213; 252/609; 524/409, 410

[56] References Cited

U.S. PATENT DOCUMENTS

| | | | |
|---|---|---|---|
| 3,004,859 | 10/1961 | Lichtenwalner | 523/212 |
| 3,357,940 | 12/1967 | Rutherford | 524/410 |
| 3,565,851 | 2/1971 | Neuroth | 523/212 |
| 3,821,140 | 6/1974 | Milbert | 523/212 |
| 4,100,075 | 7/1978 | Ashman et al. | 523/210 |
| 4,340,090 | 7/1982 | Matsushita et al. | 523/213 |

*Primary Examiner*—Joseph L. Schofer
*Assistant Examiner*—N. Serofim
*Attorney, Agent, or Firm*—Paul W. Leuzzi, II

[57] ABSTRACT

An inorganic antimony compound that is surface modified with up to about 10 percent by weight of a polysiloxane results in a flame retardant with improved rheology, flow, storage and dispersing characteristics.

18 Claims, No Drawings

POLYSILOXANE TREATED ANTIMONY COMPOUNDS

BACKGROUND OF THE INVENTION

This invention relates to finely divided particulate inorganic antimony compounds, and more particularly, to antimony oxides and sulfides which are surface modified with up to about 10% by weight of a polysiloxane compounds.

A number of antimony compounds have been used as flame-retardants for various organic resins and elastomers. One commonly used compound is antimony trioxide. One of the difficulties associated with the use of antimony compounds such as antimony oxides and antimony sulfides to improve the flame-retardant properties of flammable organic resins and elastomers is the degradation of some of the other desirable properties of the treated elastomers and resins. Although the incorporation of small amounts of antimony oxides and antimony-sulfides in conjunction with organic flame-retardant compounds into flammable resins and elastomers has improved the flame-retardant properties of the resulting product, the incorporation of such antimony compounds often has an adverse effect on other properties of the resins and elastomers such as flexural strength, impact strength, tensile strength, flexural modulus and hardness.

The above-described adverse effects are not limited to the antimony oxides and sulfides. The literature describes procedures for filling thermoplastic and other polymers with many inorganic oxides, primarily as fillers. Examples of inorganic oxides which have been used as fillers for resins and elastomers include aluminum oxide, zinc oxide, iron oxide, magnesium oxide, titanium dioxide, silicates such as kaolin clay, mica, calcium silicate and aluminum silicate, calcium carbonate such as limestone, etc. In the initial development of this art, the inorganic oxide materials, in particulate form were introduced and blended into resins and elastomers. The resulting mixtures were molded by conventional methods such as casting, injection molding, extrusion or rotational molding to form inorganic oxide reinforced plastic articles. However, it generally was found that the properties of such filled articles were not as good as expected or desired.

Various suggestions have been made in the literature for improving the results obtained when such inorganic oxide materials are incorporated into resins and elastomers. A number of suggestions for overcoming these problems have involved the use of silicon-containing compounds, and particularly silane coupling agents.

U.S. Pat. No. 3,793,288, suggests that the bonding relationship between polymers and the inorganic oxides may be improved by treating the polymer itself, rather than by treatment of the inorganic oxide. Accordingly, U.S. Pat. No. 3,793,288 applies a surface on the thermoplastic polymer which comprises an organofunctional silane coupling agent and a copolymer of ethylene and acrylic acid and/or methacrylic acid. It is reported that such coated polymers, when blended and molded in combination with particulate inorganic oxides yield significant improvements in processing and in properties.

Surface modification of powdered antimony oxide with silanes is described in an article published in Applied Spectroscopy, 29 (6) pages 512-517 (1975). The authors of this article describes the surface modification of antimony oxide with chlorosilanes or by dissolving antimony oxide in hydrochloric acid prior to a reaction with an aminosilane. The incorporation of these treated antimony oxides in epoxy resins or other organic formulations in amounts ranging from 10 to 100% by weight of the modified oxide is described.

U.S. Pat. No. 3,641,087 described the use of brominated silane derivatives in combination with methal oxides such as antimony oxides and organic antimonates as flame-retardant additives for synthetic polymer compositions. The separate addition of metal oxides such as antimony oxide and other additives such as silanes and diallyl chlorendates to diallylic phthalate resins is described in U.S. Pat. No. 3,483,158. Such compositions are reported to be flame-retardant.

U.S. Pat. No. 4,100,075 attempted to solve the many of these problems by coating antimony compounds with up to 5% by weight of an organosilane having hydroxy or ether linkages. Comparative data set forth herein indicates that many of these compounds have been found to be relatively ineffective.

Additional art which teaches the use of antimony compounds with silane materials to achieve flame retardance include Kokai Tokkyo Koho Nos. 79/113,646; 79/37,160; 79/37,161; 75/114,485; 79/76,646; 79/76,647; 79/101,862; 78/65,347; 76/132,251; 75/73,943; German Offen. No. 2,448,993 and Appl. Spectros, 1975, 29 (6) pp. 512–517.

Despite the efforts that preceded the instant invention there continued to exist a need for a modified antimony flame retarding, smoke suppressing compound which retained the physical properties of the formulated elastomers and polymers it was employed in, which reduced polymer specification and which demonstrated improved rheology, flow, storage and dispersing characteristics.

SUMMARY OF THE INVENTION

The instant invention provides novel inorganic antimony compounds which are surface modified with a polysiloxane. The polysiloxanes useful for modifying the antimony surface are represented by the formula:

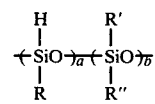

wherein R, R' and R" are individually alkyl, alkenyl, aryl, alkylaryl, alkoxy, ether, ester, carboxyl, or amino groups having from 1 to 18 carbon atoms, and a+b equals from 2 to 1,000 provided a/b is greater than 0.5.

An improvement in the flame-retardant properties of resins and elastomers is obtained by incorporating the surface-modified antimony compound into the resin or elastomer in an amount sufficient to prove the desired flame-retardant properties. The employment of the surface-modified antimony compound provides these properties without adverse effects on the physical characteristics of the resin or elastomer itself.

An additional aspect of the invention is that the polysiloxanes noted above were found to be effective thermal stabilizers for polyarylates.

DETAILED DESCRIPTION OF THE INVENTION

In accordance with the present invention there are provided novel inorganic antimony compounds which are treated with polysiloxanes for enhancing the flame-retardant properties of elastomers and resins.

The antimony compounds which are treated in accordance with the invention are antimony oxides and sulfides. The antimony oxide compounds which may be modified in accordance with this invention include antimony oxides such as antimony trioxide, antimony pentoxide, antimony tetroxide, antimony oxychlorides and metal antimonates such as hydrated potassium antimonate and sodium antimonate. Special pre-treatments of these antimony compounds are not required although it is preferred that the particulate antimony compounds be of suitable particle size range for incorporation into resins and elastomers in a normal manner. Suitable particle size of the antimony oxides are from 0.01 to 100 microns, more preferably 0.1 to 10 microns. The presence of residual moisture on the surface of the antimony particles is not considered detrimental and, in certain instances, may be preferred. Thus, hydrated antimony oxides are contemplated as being useful in the invention. The preceding statements concerning antimony oxide are applicable to the antimony sulfides as well.

The inorganic antimony compound is surface modified with a polysiloxane having the general formula

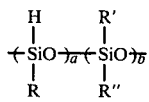

wherein R, R' and R" are individually alkyl, alkenyl, aryl, alkylaryl, alkoxy, ether, ester, carboxyl or amino groups having from 1 to 18 carbon atoms, and a+b equals from 2 to 1,000 provided a/b is greater than 0.5. It is preferred that R, R' and R" individually contain no more than ten carbon atoms and more preferred that R, R' and R" be methyl groups. The value of "a+b" is preferably between 10 to 100. Although polysiloxanes where "b" is greater than zero are contemplated, it is preferred that "b" be equal to zero. In any event "a/b" must be more than 0.5.

Suitable examples of polysiloxanes useful for surface-modifying the inorganic antimony compound include, but are not limited to, methyl hydrogen polysiloxane, ethyl hydrogen polysiloxane, propyl hydrogen polysiloxane, cyclohexyl hydrogen polysiloxane, phenyl hydrogen polysiloxane, gamma-aminopropyl hydrogen polysiloxane, 11-chloroundecyl hydrogen polysiloxane, gamma-methacryloxypropyl hydrogen polysiloxane, vinyl hydrogen polysiloxane, beta-(3,4-epoxycyclohexyl) hydrogen polysiloxane, mercaptoethyl hydrogen polysiloxane, chlorophenyl hydrogen polysiloxane, dimethyl polysiloxane copolymer of the above.

The preferred polysiloxane for surface treatment of the antimony compound is methyl hydrogen polysiloxane.

The surface modified antimony compounds of this invention can be prepared by dissolving the desired amount of siloxane or mixture of siloxanes in a suitable solvent and thereafter blending the antimony compound with the dissolved siloxane. Alcohols such as methanol are useful as solvents. Alternatively, the siloxane may be mixed with water or a water alcohol mixture which is then blended with the antimony compound. Another method for accomplishing the surface modification of the antimony compounds is to intimately mix the desired amount of siloxane with the antimony compound in the absence of added solvents. The amount of siloxane added to the antimony compounds can be varied but generally will be no more than about 10% by weight based on the weight of the antimony compound. The preferred amount of polysiloxane is about 2.0 weight percent. It is to be noted that overdosing of the polysiloxane should be avoided. When water or solvent is utilized to facilitate the coating of the antimony compounds, the product is subjected to a drying cycle to remove the water and/or solvent. Drying times of up to about four to five hours at temperatures of about 25° to 400° C. have provided satisfactory results. Drying for one-half to two hours at 100° C. to 250° C. is preferred and at 200° C. for two hours gave the best results.

The resin or elastomer that the polysiloxane modified antimony compound imparts improved flame-retardant properties to includes, but is not limited to, polyester, polyarylates, polycarbonates, polyamides, polyimides, polyolefins, epoxies, and blends or alloys thereof.

Whereas the exact scope of the present invention is set forth in the appended claims, the following specific examples illustrate certain aspects of the invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLE 1

Antimony trioxide with a particle size of 1.3 micron and having a specific gravity of 5.7 is mixed in a conventional blender at a low speed for 15 to 20 minutes during which time a surface-modifying agent is slowly added to the blend. The blend is thereafter dried for two hours at 100° C.

The surface-modified antimony trioxide is then extruded into a polyester alloy containing 60 parts polyarylate and 40 parts polyethylene terephthalate at 2 phr at 260° C. The extrudate is then thoroughly dried and tested in a melt index machine for melt flow after a 10 minute preheat ($MF_{10}$) and after a 30 minute preheat ($MF_{30}$) at 275° C.

Test results are given in Table I below:

TABLE I

| SURFACE MODIFYING AGENT | WT. PERCENT TREATMENT ON ANTIMONY OXIDE | TREATMENT COMMENT | MELT FLOW AT 275° $MF_{10}$ | MELT FLOW AT 275° $MF_{30}$ |
|---|---|---|---|---|
| Methyltrimethoxysilane | 2.0 | 4,5 | 27.3 | 47.4 |
| γ-Methacryloxypropyltrimethoxysilane | 2.0 | 4,5 | 26.0 | 45.7 |
| β-(3,4-Epoxycyclohexyl)ethyltrimethoxysilane | 2.0 | 4 | 24.2 | 46.4 |
| γ-Glycidoxypropyltrimethoxysilane | 2.0 | 4 | 17.3 | 32.5 |
| Vinyltriacetoxysilane | 2.0 | 4,5 | 25.2 | 45.3 |

TABLE I-continued

| SURFACE MODIFYING AGENT | WT. PERCENT TREATMENT ON ANTIMONY OXIDE | TREATMENT COMMENT | MELT FLOW AT 275° $MF_{10}$ | MELT FLOW AT 275° $MF_{30}$ |
|---|---|---|---|---|
| γ-Mercaptopropyltrimethoxysilane | 2.0 | 4,5 | 25.1 | 41.7 |
| γ-Aminopropyltriethoxysilane | 2.0 | 4 | 21.5 | 40.3 |
| N—β-(aminoethyl)-γ-aminopropyltrimethoxysilane | 2.0 | 4 | 30.7 | 36.4 |
| Octyltriethoxysilane | 2.0 | 5,7 | 38.8 | 64.5 |
| 1,2 Di(hexamethoxysilyl) Ethane | 2.0 | | 23.3 | 46.9 |
| 1,2 Di(hexamethoxysilyl) Ethane | 2.0 | 2,4 | 18.8 | 36.3 |
| —Glycidoxypropyltrimethoxysilane | 4.0 | 4,6 | 27.83 | 42.67 |
| Methyl hydrogen reactive fluid | 2.0 | 3 | 9.5 | 15.9 |
| Methyl hydrogen reactive fluid | 4.0 | 3 | 19.7 | 34.6 |
| Methyl hydrogen reactive fluid | 4.0 | 3,9 | 9.18 | 13.51 |
| Methyl hydrogen reactive fluid | 10.0 | 3 | 18.5 | 40.2 |
| Methyl hydrogen reactive fluid | 2.0 | 3 | 7.06 | 11.18 |
| Methyl hydrogen reactive fluid | 4.0 | 3,6 | 22.04 | 32.50 |
| Epoxy - modified dimethyl oil | 2.0 | 3 | 28.8 | 50.3 |
| Conventional masonry water repellent (partially hydrolyzed) | 2.0 | 3 | 25.3 | 47.9 |
| Epoxy - modified dimethyl oil | 2.0 | 3 | 31.9 | 57.1 |
| Aminofunctional dimethyl oil | 2.0 | 3 | 25.0 | 43.8 |
| Conventional dimethyl oil | 2.0 | 3 | 19.88 | 33.32 |
| Mixture-Methyl hydrogen fluid + Hydroxy terminated fluid | 4.0 | 3 | 16.91 | 29.81 |
| Methyl hydrogen reactive fluid/dimethyl oil Copol. 19 cc $H_2$/g | 2.0 | 3 | 20.67 | 39.51 |
| Methyl hydrogen reactive fluid Copol. 28.8 cc $H_2$/g, D/D-72/2.6 | 2.0 | 3 | 23.25 | 40.93 |
| Methyl hydrogen reactive fluid/dimethyl oil Copol. 30 cc $H_2$/g | 2.0 | 3 | 21.69 | 40.49 |
| Methyl hydrogen reactive fluid Copol. 93 cc $H_2$/g, D/D-10/5 | 2.0 | 3 | 23.79 | 41.75 |
| Condensed species containing higher level of ethoxy then does EBDMS 1524 | 2.0 | 3 | 23.7 | 42.4 |
| Condensed species containing higher level of ethoxy then does EBDMS 1524 | 2.0 | 3,9 | 17.8 | 35.1 |
| Contains 7-8% ethoxy groups | 2.0 | 3 | 24.2 | 46.4 |
| Contains 7-8% ethoxy groups | 2.0 | 3,9 | 25.9 | 45.3 |
| γ-Aminopropyltriethoxysilane | 1.0 | 1 | 46.8(10) | 74.4(10) |
| γ-Methacryloxypropyltrimethoxysilane | 1.0 | 1 | 56.8(10) | 87.9(10) |
| Isopropyltriisostearoyltitanate | 1.0 | 1 | 61.8(10) | 94.1(10) |
| Isopropylisostearoyldiacryltitanate | 1.0 | 1 | 67.5(10) | 95.8(10) |
| Tetra(2,2-diallyloxymethyl)-1-buteneoxy titanium di(di-tridecyl) phosphite | 1.0 | 1 | 66.1(10) | 103.8(10) |

(1) Pretreated antimony oxide samples
(2) Not treated in blender
(3) Silicon derivative diluted to about 50 Wt. % active in hexane diluent.
(4) Silicon derivate diluted to about 50 Wt. % active in 90/10 methanol/water: hydrolysis allowed to occur for 30–60 minutes prior to application to antimony trioxide surface.
(5) same as (4) but pH adjusted to 4 to facilitate hydrolysis
(6) n-butylamine catalyst added at 25% of functional silane weight.
(7) Similar to (4) except 90/10 acetone/water.
(8) Dried at 200° C. for 2 hours rather than the usual 100° C. for 2 hours
(10) Extruded at 270° C. rather than the usual 260° C.

COMPARATIVE EXAMPLES A-D

Following the procedure of Example 1 in every material detail except that either no antimony trioxide or untreated antimony trioxide is employed the following results were obtained.

TABLE II

| SURFACE MODIFYING AGENT | Melt Flow $MF_{10}$ | $MF_{30}$ |
|---|---|---|
| Polyester Alloy, No $Sb_2O_3$ | 3.8 | 4.4 |
| Polyester Alloy, No $Sb_2O_3$ | 5.5(10) | 5.8(10) |
| Polyester Alloy, 2 phr Untreated $Sb_2O_3$ | 29.1 | 50.0 |
| Polyester Alloy, 2 phr Untreated $Sb_2O_3$ | 50.3(10) | 75.6(10) |

In comparison of all of this data, it is obvious that only those systems of $Sb_2O_3$ treated with the methyl hydrogen reactive fluid exhibit melt flows after 10 minutes and 30 minutes in range of the control polyester alloy sample. The other surface treatments exhibit melt flow values closer to untreated $Sb_2O_3$ modified polyester alloy. Thus the methyl hydrogen silicone fluid allows for more consistent viscosity control of the resultant mixture of $Sb_2O_3$ and the blend of polyarylate and poly (ethylene terephthalate).

CONTROL E

Polyarylate comprised of bisphenol A and tere/iso phthalate (50/50 tere/iso ratio) with a reduced viscosity of 0.57 (as measured in chloroform 0.2 g/100 ml at 25° C.) in a solution of diphenylether (55 wt. % diphenylether) was held at 80° C. and allowed to crystallize. The crystalline product was ground into small particles. This product was devolatilized in a double vented extruder with the first vent at 320° C. and atmospheric pressure and the second vent at 340° C. and approximately 1 mm Hg pressure. The melt flow was determined on the devolatilized product at 375° C. after 10 minutes and 30 minute preheat in a melt index apparatus. The results are listed in Table 2.

EXAMPLE 2

The same polyarylate and procedure was followed above (E) except that 0.025, 0.05, and 0.10 wt. % methyl hydrogen silicone was added (based on weight of the polyarylate) prior to devolatilization. The melt flow results are listed in Table 2. The results show that methyl hydrogen silicone addition is effective in decreasing the initial melt flow value as well as in stabilizing the polymer as the $MF_{30}/MF_{10}$ value is lower than the control.

TABLE 2

Melt Flow Data on Methyl Hydrogen Silicone Stabilized Polyarylate

| Description | 375° C. Melt Flow Data | |
|---|---|---|
| | MF$_{10}$ (dg/min.) | MF$_{30/10}$ |
| Control Polyarylate | 15.3 | 2.92 |
| +0.025 wt. % methyl hydrogen silicone | 11.8 | 1.85 |
| +0.050 wt. % methyl hydrogen silicone | 9.9 | 1.87 |
| +0.10 wt. % methyl hydrogen silicone | 5.8 | 2.64 |
| +4.0 wt. % TiO$_2$ | 26.8 | 2.75 |
| +4.0 wt. % TiO$_2$ 0.1 wt. % methyl hydrogen silicone | 7.2 | 3.25 |

EXAMPLE 3

The same polyarylate and procedure was followed as with Control E except that one sample contained 4.0 wt. % TiO$_2$ and another sample contained 4.0 wt. % TiO$_2$+0.1 wt. % methyl hydrogen silicone. The data are listed in Table 2. The melt flow for the control polyarylate +4% TiO$_2$ is higher than the unmodified control whereas with the polyarylate/TiO$_2$ sample with L-31 added has a lower melt flow than the control and only slightly higher than the polyarylate/methyl hydrogen silicone sample with an equivalent amount of methyl hydrogen silicone. This example demonstrates that the methyl hydrogen silicone does not have to be precoated on the filler article but can be added during a compounding operation. The data also illustrate that the methyl hydrogen silicone additive is effective in preventing a large decrease in viscosity (increase in melt flow) when certain metal oxides (e.g. TiO$_2$) are added which may cause polymer degradation.

We claim:

1. An inorganic antimony compound surface modified with up to about 10 percent by weight of a polysiloxane having the formula:

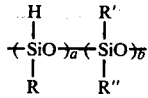

wherein R, R' and R'' are individually alkyl, alkenyl, aryl, alkylaryl, alkoxy, ether, ester, carboxyl, or amino groups having from 1 to 18 carbon atoms, and a+b equals from 2 to 1,000 provided a/b is greater than 0.5.

2. The compound of claim 1 wherein R, R' and R'' individually contain 1 to 10 carbon atoms.

3. The compound of claim 2 wherein R, R' and R'' are all methyl groups.

4. The compound of claim 1 wherein a+b equals 10 to 100 inclusive.

5. The compound of claim 4 wherein b is zero.

6. The compound of claim 1 wherein the polysiloxane is methyl hydrogen polysiloxane.

7. The compound of claim 1 wherein the inorganic antimony compound is antimony oxide.

8. The compound of claim 7 wherein the antimony oxide is antimony trioxide.

9. The compound of claim 1 wherein antimony compound is antimony sulfide.

10. The compound of claim 8 wherein R is methyl, b is zero and a is from 10 and 100 inclusive.

11. The compound of claim 8 wherein the inorganic antimony trioxide is surface modified with a trimethyl end blocked polymer of dichloromethyl siloxane.

12. A method for improving the flame-retardant properties of organic resins and elastomers which comprises incorporating into the resin or elastomer an effective amount of the surface-modified antimony compound of claim 1.

13. The process of claim 12 wherein the surface-modified antimony compound comprises up to about 15% by weight of the resin of elastomer.

14. An organic resin or elastomer which contains up to about 15% by weight of the surface-modified inorganic antimony compound of claim 1.

15. A product comprised of polyarylate or poly(arylate-carbonate) and 0.001 wt. % to about 1 wt. % of the polysiloxane described in claim 1.

16. A product described in claim 15 wherein an additional polyester is added.

17. A product described in claim 16 wherein the polyester is poly(ethylene terephthalate).

18. A product described in claim 15 wherein a metal oxide is added up to 15 wt. % of the polyarylate or poly(arylate-carbonate).

* * * * *